(12) United States Patent
Tjhi (10) Patent No.: US 8,477,137 B2
(45) Date of Patent: Jul. 2, 2013

(54) METHOD AND APPARATUS FOR GENERATING A MATERIAL FLOW DIAGRAM FOR AN INDUSTRIAL PLANT

(75) Inventor: Wilson Chandra Tjhi, Singapore (SG)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 586 days.

(21) Appl. No.: 12/727,765

(22) Filed: Mar. 19, 2010

(65) Prior Publication Data

US 2011/0227926 A1    Sep. 22, 2011

(51) Int. Cl.
*G06T 11/20*    (2006.01)
*G06F 9/44*    (2006.01)

(52) U.S. Cl.
USPC .......................................... 345/440; 717/105

(58) Field of Classification Search
None
See application file for complete search history.

(56) References Cited

U.S. PATENT DOCUMENTS

2005/0149905 A1 *    7/2005    Brink ........................... 717/100

OTHER PUBLICATIONS

Sly "Material Flow Analysis of Automotive Assembly Plants Using FACTORYFLOW", Proc. 1995 Winter Simulation Conference.*
FactoryFlow Tutorial, downloaded from internet http://web.archive.org/web/20060909174647/http://www.ceet.niu.edu/faculty/ghrayeb/IE460/FactoryFLOW_Tutorial.pdf, available since Sep. 9, 2006.*
FactoryFlow Guide, FactoryFlow Class Guide v.1.2, Feb. 6, 2002.*

* cited by examiner

*Primary Examiner* — Xiao M. Wu
*Assistant Examiner* — Yingchun He
(74) *Attorney, Agent, or Firm* — Westerman, Hattori, Daniels & Adrian, LLP (57) ABSTRACT

A method of generating a material flow diagram for an industrial plant. The method comprises creating at least one data set from at least one graphics file representing at least a portion of the industrial plant; extracting data from the at least one data set to obtain material-specific data for each of a plurality of distinct materials flowing in the industrial plant; and illustrating the material-specific data of a selected at least one of the plurality of distinct materials as a material flow diagram.

20 Claims, 13 Drawing Sheets

```
<Line Name="LINE001" From="PageG0002" To="FurnaceA"
Material="STEAM" GraphicFile="G0003" />

<Furnace Name="FurnaceA" From="LINE001" To="LINE003"
Material="STEAM" GraphicFile="G0003" />

<Furnace Name="FurnaceA" From="LINE002" To="LINE003"
Material="OIL" GraphicFile="G0003" />

<Readings Name="SteamPressureA" For="LINE001"
GraphicFile="G0003" />
```

METHOD AND APPARATUS FOR GENERATING A MATERIAL FLOW DIAGRAM FOR AN INDUSTRIAL PLANT

FIELD OF THE INVENTION

The invention relates to method and apparatus for generating a material flow diagram for an industrial plant and particularly, though not exclusively, relates to generating material flow diagrams for selected materials moving in an industrial plant.

BACKGROUND

Distributed Control Systems (DCS) are typically used to monitor and control processing and flow of materials in industrial plants. The materials may include production related materials, such as hot oil and gaseous products in an oil refinery, as well as production support materials, such as cooling water or steam. Several different materials may be simultaneously moved, used, treated processed, and so on during operation of the plant. Proper control and monitoring of material flow in such plants is therefore crucial to efficiency and safety of the plant.

Because the Process and Instrumentation Diagrams (P&ID) of industrial plants can be complex and difficult to read, an industrial plant may be visually represented by means of one or more graphics files created by engineers from the P&ID. A graphics file typically represents at least a portion of the physical layout of the plant. By calling up a specific graphics file, an operator can monitor a corresponding portion of the plant represented by that graphics file. However, a problem related to a particular material in one portion of the plant may be caused by something else at another portion of the plant, requiring operators to trawl through multiple graphics files to trace problems to their roots. Depending on the level of detail created or provided in the various graphics files, operators may even be required to memorize specific graphics files relating to specific portions of the plant if links between various graphics files are not sufficiently provided. A plant by multiple graphics files does not allow operators to have a general overview of larger processes within the plant, making it difficult for operators to understand more complex problems that may occur.

SUMMARY OF THE INVENTION

According to a first exemplary aspect, there is provided a method of generating a material flow diagram for an industrial plant. The method comprises creating at least one data set from at least one graphics file representing at least a portion of the industrial plant; extracting data from the at least one data set to obtain material-specific data for each of a plurality of distinct materials flowing in the industrial plant; and illustrating the material-specific data of a selected at least one of the plurality of distinct materials as a material flow diagram.

The method preferably further comprises selectably displaying at least a portion of the material flow diagram, and may also further comprise selectably displaying at least one of the plurality of graphics files relevant to the displayed portion of the material flow diagram. The method may further comprise displaying readings obtained from the at least one data set on the material flow diagram.

Creating the at least one data set may include entering data into at least one dialog box provided for the at least one graphics file, and may include automatically generating data during creation of the at least one graphics file. The at least one graphics file preferably comprises a number of elements and creating the at least one data set may include associating each element with one of the plurality of distinct materials.

Creating the at least one data set may further include associating each element with at least one related element, the related element being selected from: a preceding element and a following element, wherein each element and its related element together form at least a portion of a flow path of one of the plurality of distinct materials.

Extracting the data preferably includes creating a material data file for each of the plurality of distinct materials, each material data file containing the material-specific data for a respective each of the plurality of distinct materials.

According to a second exemplary aspect, there is provided an apparatus for generating a material flow diagram for an industrial plant. The apparatus comprises a data set creation module configured for creating at least one data set from at least one graphics file representing the industrial plant; a data extraction module configured for extracting data from the at least one data set to obtain material-specific data for each of a plurality of distinct materials flowing in the industrial plant; and a flow illustrating module configured for illustrating the material-specific data of a selected one of the plurality of distinct materials as a material flow diagram.

The apparatus preferably further comprises a diagram display configured for selectably displaying at least a portion of the material flow diagram. The diagram display may be configured for selectably displaying the at least one graphics file relevant to the displayed portion of the material flow diagram, and may further be configured for displaying readings on the material flow diagram, the readings being obtained from the at least one data set.

The data set creation module is preferably configured to provide at least one dialog box for the at least one graphics file, the dialog box being configured for entering data therein.

The data set creation module may also be configured for automatically capturing data generated during creation of the at least one graphics file.

The at least one graphics file preferably comprises a number of elements. The data in the at least one data set preferably includes association of each element with one of the plurality of distinct materials and preferably further includes association of each element with at least one related element, the related element being selected from: a preceding element and a following element, wherein each particular element and its related element together form at least a portion of a flow path of one of the plurality of distinct materials.

The data extraction module is preferably configured to create a material data file for each of the plurality of distinct materials, each material data file containing the material-specific data for a respective each of the plurality of distinct materials.

For both aspects, the material-specific data for a particular one of the plurality of distinct materials preferably comprises data of all elements in the at least one graphics file associated with the particular one of the plurality of distinct materials.

BRIEF DESCRIPTION OF THE DRAWINGS

In order that the invention may be fully understood and readily put into practical effect there shall now be described by way of non-limitative example only exemplary embodiments of the present invention, the description being with reference to the accompanying illustrative drawings.

In the drawings:

FIGS. 5(a) and (b) are exemplary screen captures of creation of a portion of a graphics file with automatic data generation;

DETAILED DESCRIPTION OF THE EXEMPLARY EMBODIMENTS

An exemplary method and apparatus for generating a material flow diagram for an industrial plant will be described with reference to FIGS. 1 to 14 below.

Figure 1:
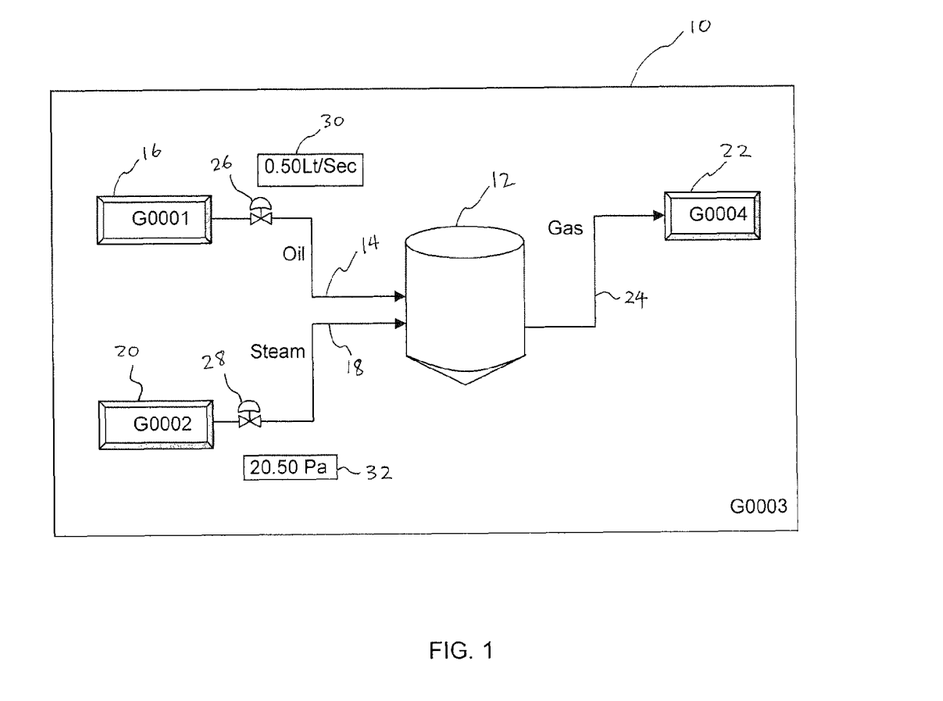
FIG. 1 is a schematic illustration of an exemplary graphics file.

In the exemplary method 50 and apparatus 60, at least a portion of the plant may be represented by at least one graphics file in which flow of one or more distinct materials is depicted by use of elements in the graphics file or files. Elements in a graphics file typically include connection lines depicting flow paths of the materials as well as other items in the plant that are associated with the flow paths, such as pieces of equipment, instruments, sensors, processors, and so on. An exemplary graphics file named G0003, 10 representing an exemplary portion of an exemplary plant is shown in FIG. 1, wherein distinct materials such as oil and steam are fed into a furnace 12 and gas is output from the furnace 12. A connection line 14 represents in-flow of the oil from another portion of the plant represented by another graphics file named G0001. From the graphics file 10, a user may access and view the other graphics file G0001 by clicking on a button 16 that results in the graphics file G0001 being displayed. Another connection line 18 represents in-flow of the steam from a further portion of the plant represented by a further graphics file named G0002. Similarly, a further button 20 is provided for a user to call up the graphics file G0002. The gas leaving the furnace 12 is fed to another portion of the plant represented by a graphics file named G0004 which can be accessed through the graphics file 10 by a button 22 provided in the graphics file 10. A connection line 24 represents flow of the gas from the furnace 12 to the portion of the plant represented by graphics file G0004. The graphics file 10 also shows sensors 26, 28 from a plant management system that are provided in the plant to obtain reading data 30, 32 to show live information related to the flow of the materials at that portion of the plant. The various elements in the graphics file 10 thus comprise non-readings elements such as the furnace 12, lines 14, 18, 24, buttons 16, 20, 22 and readings elements such as the sensors 26, 28 and reading data 30, 32. The non-readings elements may further be sub-classified as instruments such as the furnace 12 and buttons 16, 20, 22, and connectors such as the lines 14, 18, 24.

Figure 2:
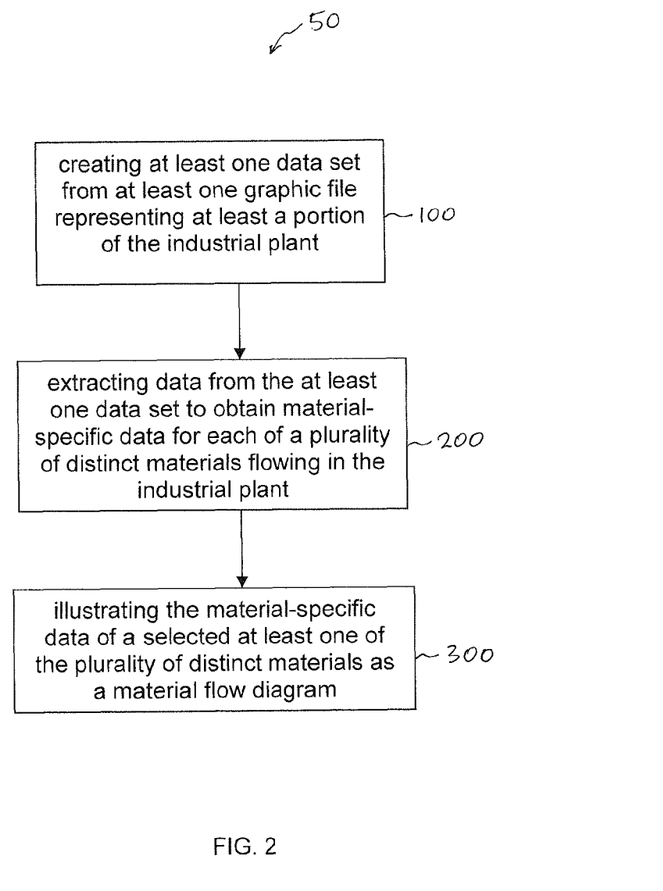
FIG. 2 is a flowchart of an exemplary method of generating a material flow diagram.
Figure 3:
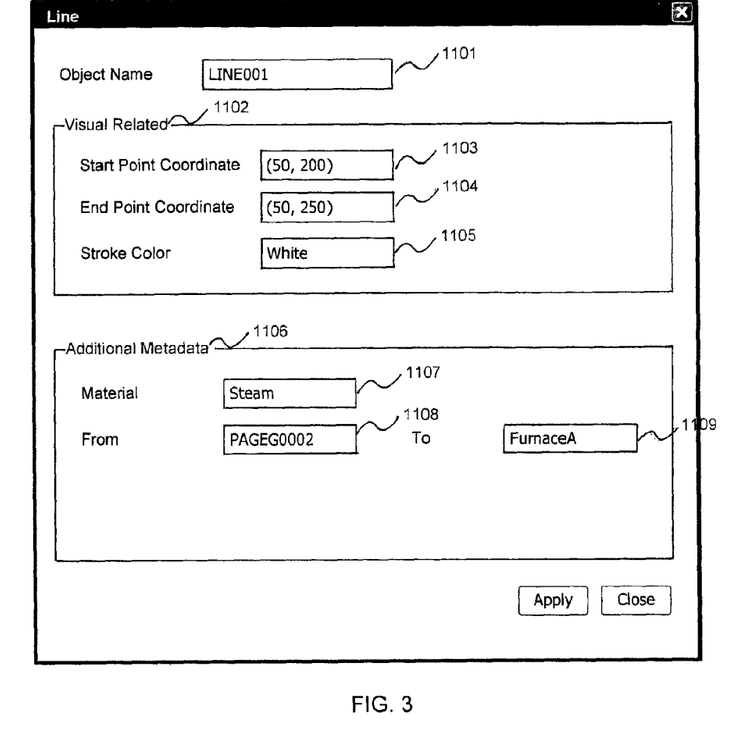
FIG. 3 is an exemplary dialog box for creating a data set.

As shown in FIG. 2, the method 50 of generating the material flow diagram for the industrial plant comprises first creating at least one data set from at least one graphics file representing at least a portion of the industrial plant 100. The apparatus 60 shown in FIG. 6 comprises a data set creation module 62 configured for this purpose. With reference to the exemplary graphics file 10 described above, creating a data set from the graphics file 10 preferably includes entering data into at least one dialog box provided by the data set creation module 62 for the graphics file 10. In an exemplary embodiment, one dialog box is provided for each element in a graphics file. An exemplary dialog box 1100 for the connection line 18 in graphics file 10 is shown in FIG. 3. The dialog box 1100 preferably includes fields in the form of text boxes for entering data. The data to be entered may include a element name 1101 for the connection line 18, and visual related properties such as a start point coordinate 1103, end point coordinate 1104 and stroke colour 1105 for depiction of the line 18 in the graphics file 10. The visual related properties may be displayed in a group 1102 for better clarity to a user.

To associate each element in the graphics file 10 with one of the plurality of distinct materials in the plant, the dialog box 1100 should preferably also include a "material" field entry text box 1107. In this example, the connection line 18 name LINE001 has been associated with "steam" as the material. In addition, each element in a graphics file is preferably also associated with at least one related element. The related element may include a preceding element and/or a following element, depending on the plant layout depicted in the graphics file, such that each element and its related element together form at least a portion of a flow path of one of the plurality of distinct materials. For example, as shown in the dialog box 1100, the connection line 18 in graphics file 10 is associated with its preceding element button 20 by entering the element name (PAGE G0002) of the button 20 into a "From" field text box 1108 provided in the dialog box 1100. The connection line 18 is also associated with its following element furnace 12 by entering the element name (FurnaceA) of the furnace 12 into a "To" field text box 1109 provided in the dialog box 1100. The button 20, connection line 18 and furnace 12 together define a flow path for the associated material, i.e., steam, as entered in the material field box 1107. The related element(s) and material association fields may be displayed as a group 1106 of additional metadata for better clarity to a user.

Figure 4:
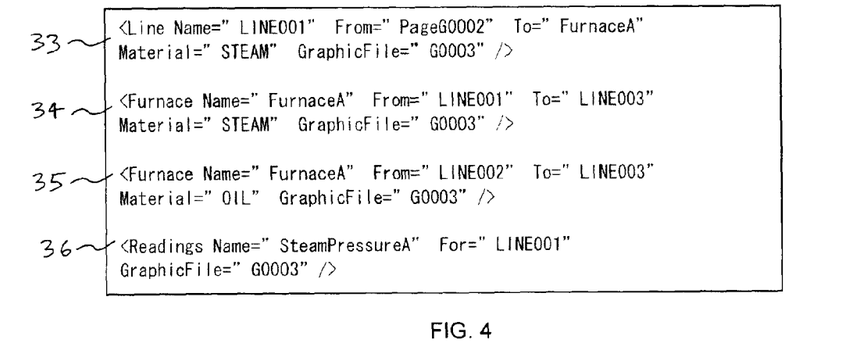
FIG. 4 is an exemplary screen shot of metadata in xml form for the graphics file of FIG. 1.

FIG. 4 shows the additional metadata from the group 1106 converted to text form entries 33 to 36, e.g. in xml representation, as part of the data set created for the graphics file 10. Each data set thus comprises one or more entries, each entry being data that has been entered or generated for one of the elements in a graphics file. Each entry for a non-readings element in the graphics file 10, i.e., a non-readings entry, typically comprises at least a "From" field, a "To" field, and an associated material for the element. It should be noted that each non-readings element in a graphics file may have more than one entry in a data set as it may feature in the flow path of more than one of the plurality of distinct materials. For example, the furnace 12 is reflected in entry 34 and entry 35, and is associated with steam in entry 34 and oil in entry 35. This properly reflects the role of the furnace 12 with respect to the two materials (oil, steam) in the portion of the industrial plant represented in the graphics file 10.

A readings entry 36, i.e., an entry 36 for a readings element 30,32 for capturing reading data, would typically comprise a readings name and another element in the graphics file to which the reading data applies, i.e., its readings-related element. For example, as shown in FIG. 1 and captured as readings entry 36 in FIG. 4, a steam pressure reading 32 named SteamPressureA applies to the connection line 18 named LINE001. A data source field is also commonly included in a readings entry. The data source is a source in the plant from where the actual reading 32 is obtained. Information from the data source is typically obtained from data captured by the DCS controlling the plant.

Figure 5:
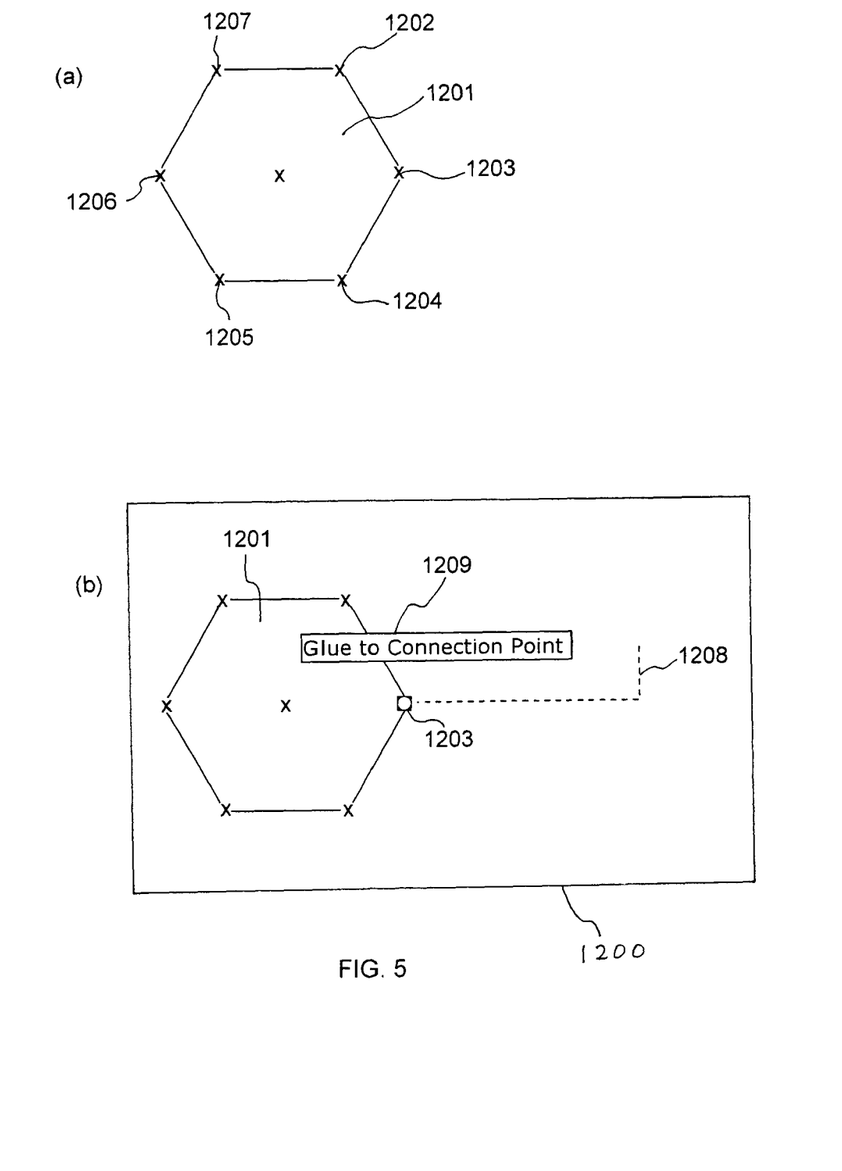

Besides entering data into a dialog box, data for the data set such as association of a particular element with its related one or more elements, e.g. the association of connection line 18 with its preceding element button 20 and its following element furnace 12, may be automatically generated during creation of the graphics file. This is facilitated by means of a connection point functionality provided in common graphics editing software such as Microsoft Visio™ that may be used to create the graphics file. For example, as shown in FIG. 5(*a*), a hexagon 1201 representing a first element in a graphics file 1200 being created in FIG. 5(*b*) is shown to have six connection points, 1202 to 1207. When a second element such as a connection line 1208 is created in the graphics file 1200, if a starting point of the line 1208 is within a certain range of the hexagon 1201, the connection point functionality automatically snaps or glues the starting point 1203 of the line 1208 to the hexagon 1201, as shown by a text notification 1209 displayed by the graphics editing software. Gluing or snapping the connection line 1208 to the hexagon 1201 automatically generates data for the data set that is created for this graphics file 1200, the automatically generated data being the association of the hexagon 1201 with the connection line 1208. In this instance, the hexagon 1201 is captured as a related (in this case preceding) element of the connection line 1208 and is automatically entered into the "From" field text box of a dialog box provided for this graphics file 1200.

Figure 6:
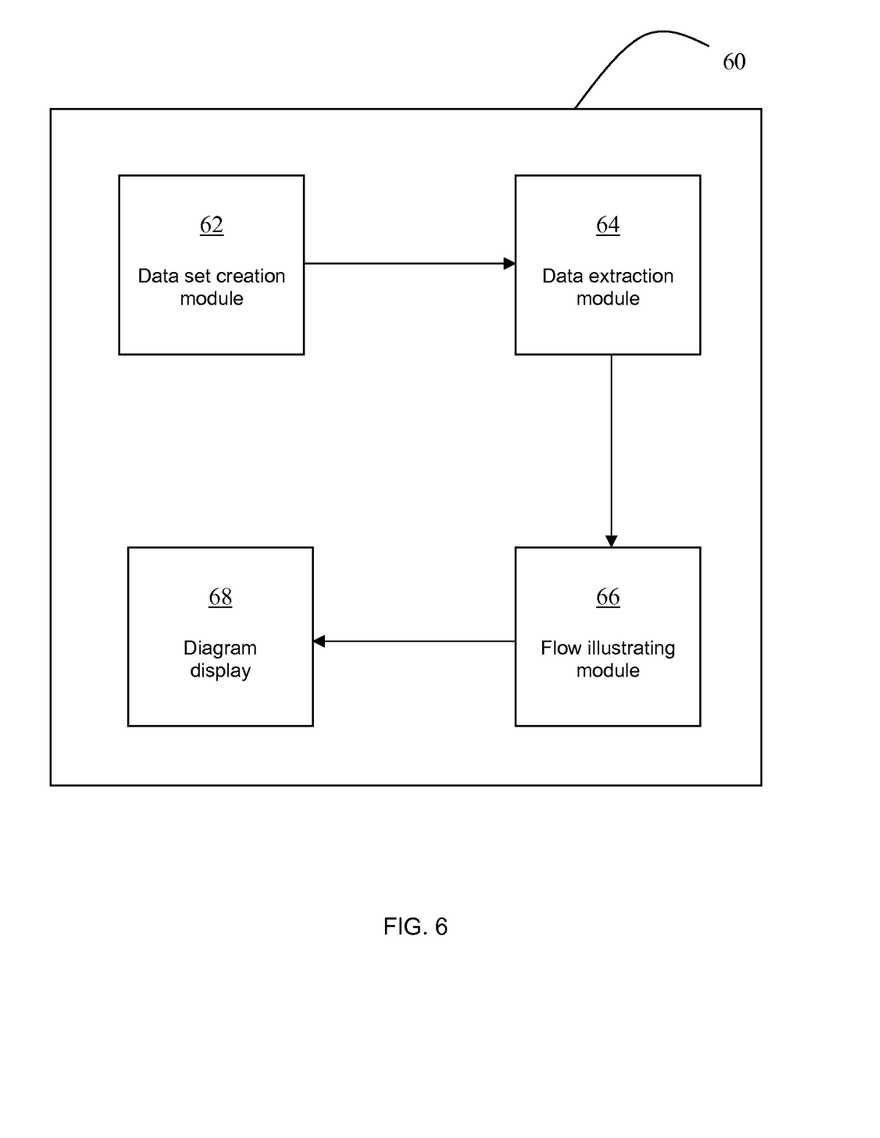
FIG. 6 is an exemplary architecture diagram of an exemplary apparatus for generating the material flow diagram.
Figure 7:
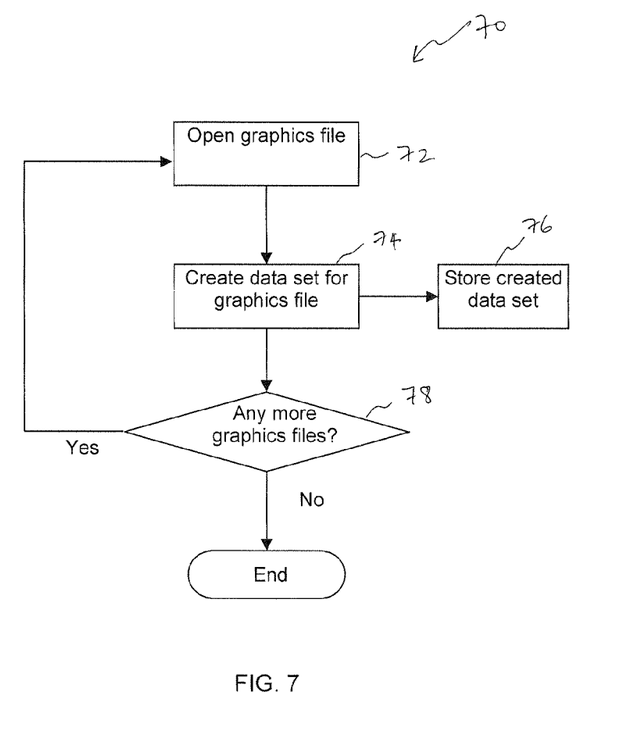
FIG. 7 is a flowchart of creating data sets from graphics files representing at least a portion of the industrial plant.

FIG. 7 shows an exemplary flowchart 70 of data set creation for an industrial plant. A user begins by opening a graphics file 72 representing at least a portion of the industrial plant. A data set for that graphics file is then created 74 using the data set creation module 62 as described above, and stored 76. The user then checks if there are more graphics files representing other portions of the industrial plant 78. If so, the user may repeat the process by opening a second graphics file 72 and creating another data set 74 for the second graphics file. This may go on until there are no further graphics files representing the industrial plant for which data sets have not yet been created. In a preferred embodiment, for each graphics file, preferably one data set is created. For a plant having a plurality of distinct materials flowing therein and represented by a number of graphics files, a corresponding number of data sets are thus created.

Alternatively, instead of opening existing graphics files to create data sets, a user may create data sets while creating one or more new graphics files to represent one or more portions of the industrial plant.

Each data set may therefore comprise material-specific data for one or more of the plurality of materials flowing in the plant. In one data set for one graphics file, the material-specific data for a particular material found in that graphics file would comprise data of all elements in that graphics file that have been associated with that particular material. Where a particular material flows through multiple portions of an industrial plant that are represented by multiple graphics files, all elements in that industrial plant that are physically associated with that particular material should thus be accordingly associated with that particular material in the data sets created for the multiple graphics files in which that particular material can be found.

With the data sets created, a data extraction module 64 of the apparatus 60 extracts data from the data sets to obtain material-specific data for each of the plurality of distinct materials flowing in the industrial plant 200. This is illustrated by flowchart 400 in FIG. 8. The data extraction module 64 opens a graphics file 401 to access a data set that has been created for that graphics file. An entry in the data set is then read 402. The data extraction module 64 checks the entry to see if a material in the entry has been encountered by the data extraction module 64 before, i.e., whether an associated material in the entry is new 403. If the material has not been encountered before, the material is considered new and a material data file for that material is created and preferably named after the material 404. The entry associated with the material is then written into the material data file for that material 405. If the associated material is not new, i.e., there is already an existing material data file for that material, the entry is written into the existing material data file 405.

Figure 8:
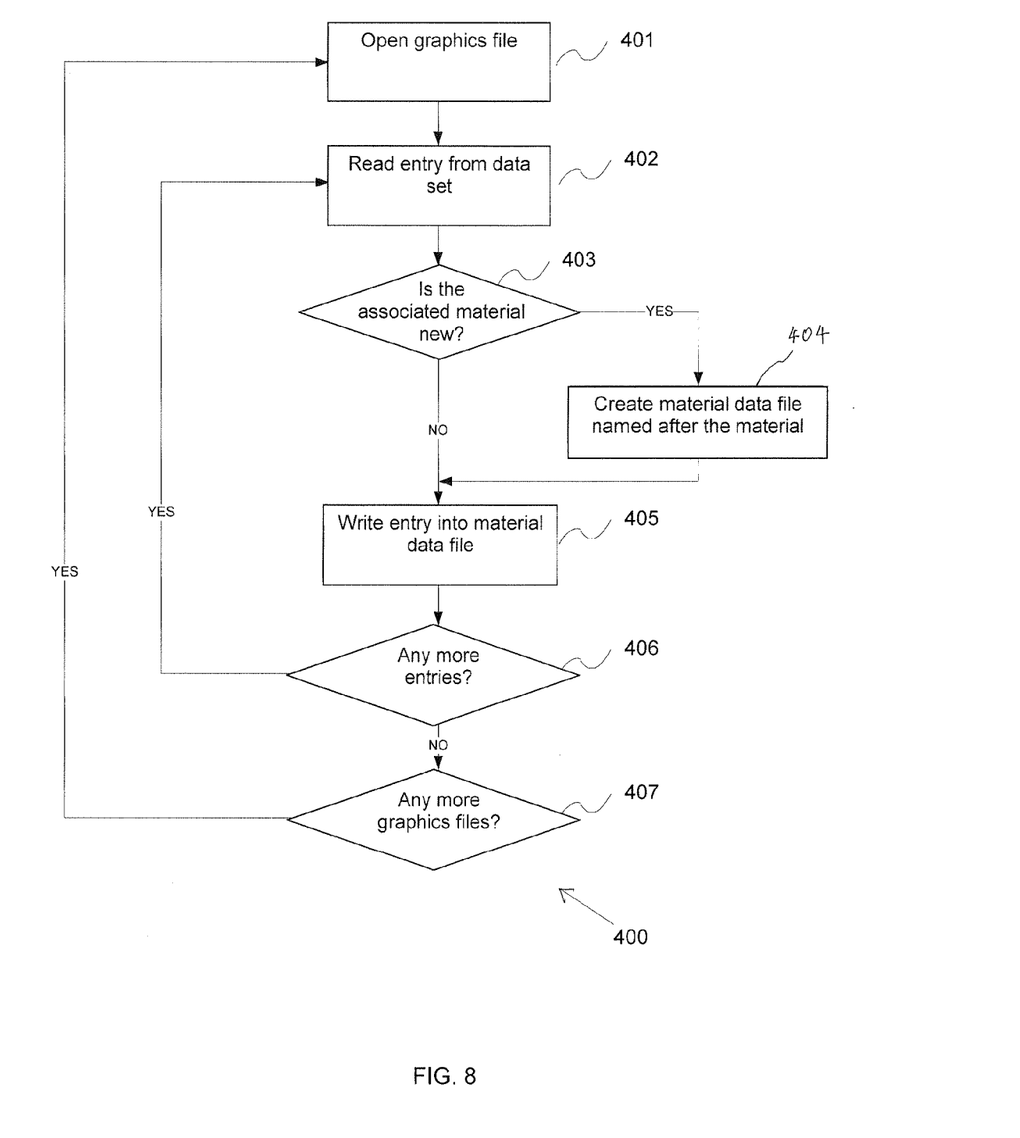
FIG. 8 is a flowchart of extracting data obtained from data sets.

The data extraction module 64 then checks if there are more entries in the data set for that graphics file. If yes, a next entry is read and steps 402, 403, 404 (if necessary), 405, and 406 are repeated until there are no more entries in the data set. When that occurs, the data extraction module 64 checks if there are any more graphics files representing other portions of the industrial plant 407. If there are, the steps 401, 402, 403, 404 (if necessary), 405, and 406 are again repeated. In this way, a plurality of material data files each containing material-specific data for each of the plurality of distinct materials flowing in the industrial plant is created from the data sets of all the graphics files representing the plant. Each material data file thus contains only entries that are specific to the material that it is named after.

By using the data set creation module 62 and the data extraction module 64, for each of the plurality of distinct materials in the plant, users can rely on the visually intuitive graphics files representing the plant to extract information and create the data sets followed by automated sorting of data from the created data sets into material-specific data. This is far simpler and more accurate than attempting to trace the flow of each material on the complex P&ID in order to extract the material-specific data for each material.

The apparatus 60 further comprises a flow illustrating module 66 configured for illustrating material-specific data of a selected at least one of the plurality of distinct materials as a material flow diagram 300. For the selected material, as shown in flowchart 500 of FIG. 9, a material data file named after the selected material is opened 501. Entries in the material data file are then arranged according to the data in their "From" and "To" fields 502. The flow illustrating module 66 is also configured to analyse all the entries to check for any branching in the flow path or paths of the selected material 503, i.e., whether there is multiple output flow from a single source, or whether there is flow from multiple sources combining into a single output. If branching is detected, the flow illustrating module 66 preferably creates a special entry named "Branch" in the material data file for the selected material 513.

Figure 9:
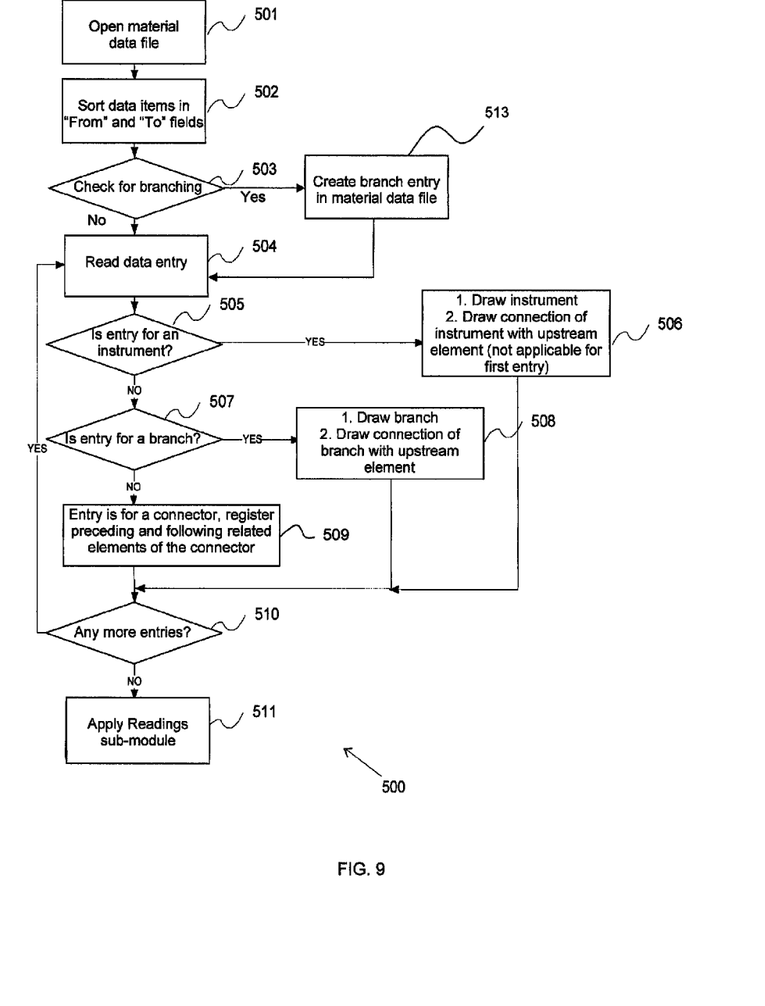
FIG. 9 is a flowchart of illustrating material-specific data as a material flow diagram.

The flow illustrating module 66 then reads an entry in the material data file 504, checking if the entry is for an instrument element in a graphics file 505. If the entry is not for an instrument element in the graphics file, the entry is checked to see if it is for a branch 507. If the entry is not for a branch, the entry has to be for a connector element in the graphics file 505. Elements found in the "From" and "To" fields of the entry for this connector element are registered for subsequent use, i.e. the preceding related element and the following related element of this connector element are noted. When a registered element is found in a subsequent entry in the material data file, this connector element can then be drawn together with the registered element found in the subsequent entry.

The flow illustrating module 66 then checks if there are further entries 510 in the material data file. If there are, step 504 is repeated. If a present entry is for an instrument element in a graphics file 505, the instrument is drawn together with its preceding related connector element 506 if the instrument is found to be a registered following related element of the connector element, as mentioned above. It should be noted that for an instrument element that happens to be in a first entry that is read from the material data file, no connector line is drawn since no connector elements have yet been read.

If a present entry is not for an instrument but is found to be for a branch, the branch is drawn together with its preceding related connector element 508 if the branch is found to be a registered following related element of the connector element, as described above.

Where a preceding related connector element is drawn for an instrument or branch in a present entry as mentioned above, where applicable, the connector element is preferably drawn to also connect with its own registered preceding related element. The registered preceding related element of the connector element is thus an upstream element with respect to the instrument or branch in the present entry, where flow of the selected material in the plant is concerned. Thus, where possible, each time an instrument or branch entry is read, the instrument or branch is drawn together with its preceding connector line to connect the instrument or branch of the present entry with an upstream element.

The flow illustrating module 66 goes on to check for more entries 10 and steps 504 to 509 are repeated where appropriate. In this way, entry by entry, a material flow diagram specific to the selected material is built up from the material-specific data in the material data file for the selected material. Preferably, information from generated material flow diagrams are saved and stored for subsequent retrieval.

For steps 506 and 508, a drawings sub-module may be provided for a user to define various drawing templates for visually representing in the material flow diagram different elements such as instruments, piping and other pieces of equipment in the plant. In the absence of user defined templates, instruments may be drawn as simple rectangles and connectors as simple arrows.

Figure 10:
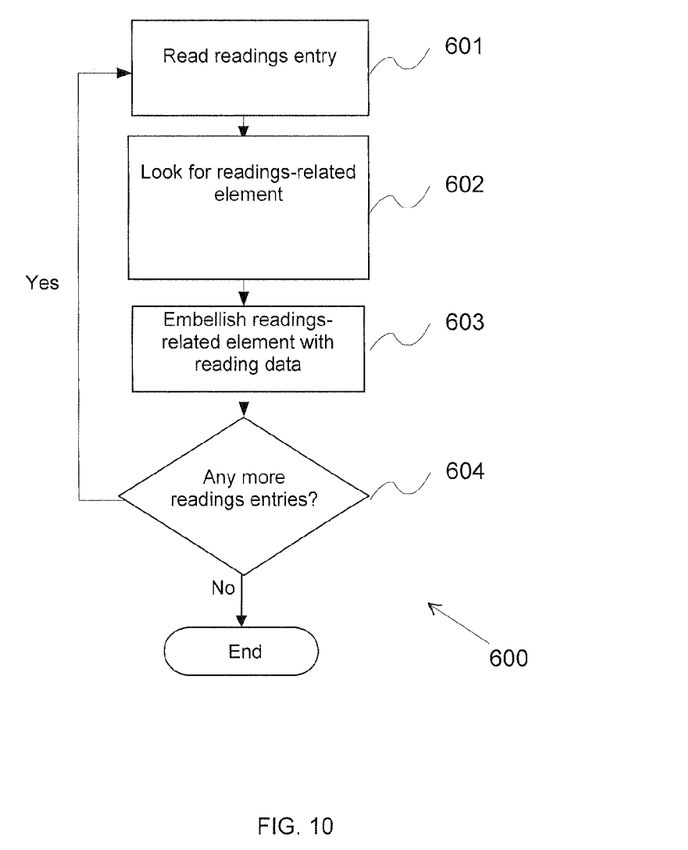
FIG. 10 is a flowchart of a sub-module for applying readings to the material flow diagram.

When all the entries in the material data file have been read and accordingly drawn, the flow illustrating module 66 may preferably activate a readings sub-module 511. As shown in FIG. 10, the readings sub-module 600 begins by reading a readings entry 601 in the material data file for the selected material and looking for a readings-related element to which the readings entry applies 602. The readings-related element is then decorated or embellished with the reading data in the readings entry 603. The material data file is searched for any more readings entries 604 and if so, steps 601 to 604 are repeated. In this way, available readings for elements associated with the specific material are reflected in the material flow diagram that has been generated for the specific material.

Figure 11:
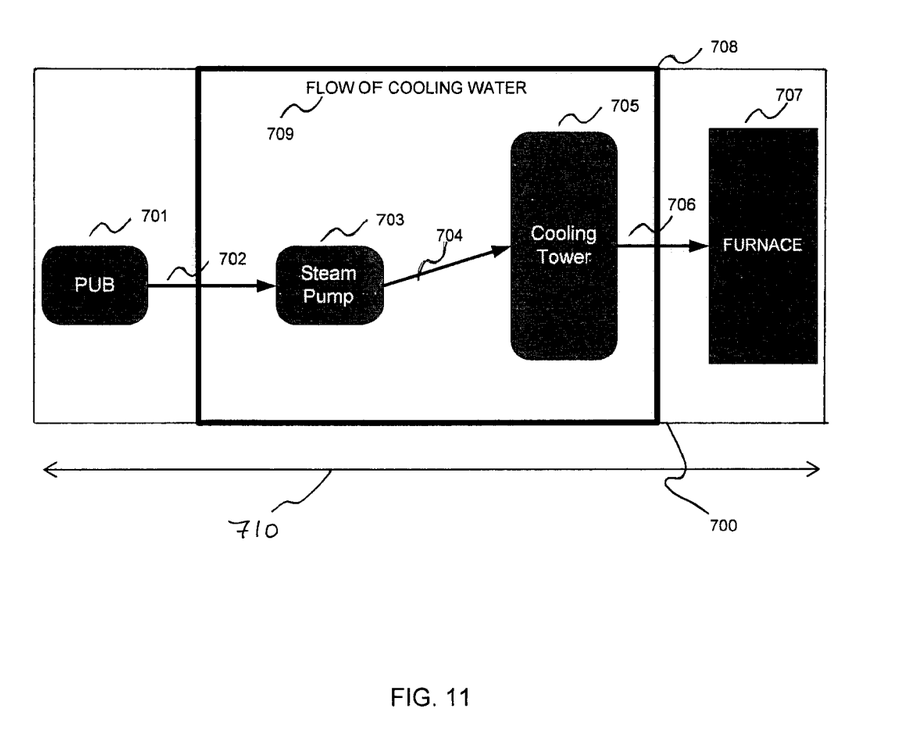
FIG. 11 is a schematic view of a material flow diagram with a portion displayed.

The apparatus 60 preferably comprises a diagram display 68 configured for selectably displaying at least a portion of a generated material flow diagram. FIGS. 11 to 14 show various exemplary displays of a generated material flow diagram. As shown in FIG. 11, the generated material flow diagram 700 comprises drawn elements 701 to 707 well as a title 709 describing the specific material associated with that material flow diagram 700. The diagram display 68 may display only a portion 708 of the material flow diagram 700 on a monitor due to screen size constraints. However, a user may select different portions of the material flow diagram 700 to be displayed by scrolling along the material flow diagram as indicated by arrow 710. To see a graphics file in which an element 701 to 707 is found, a user may click or double-click on the element 701 to 707 to call up and display the relevant graphics file.

Figure 12:
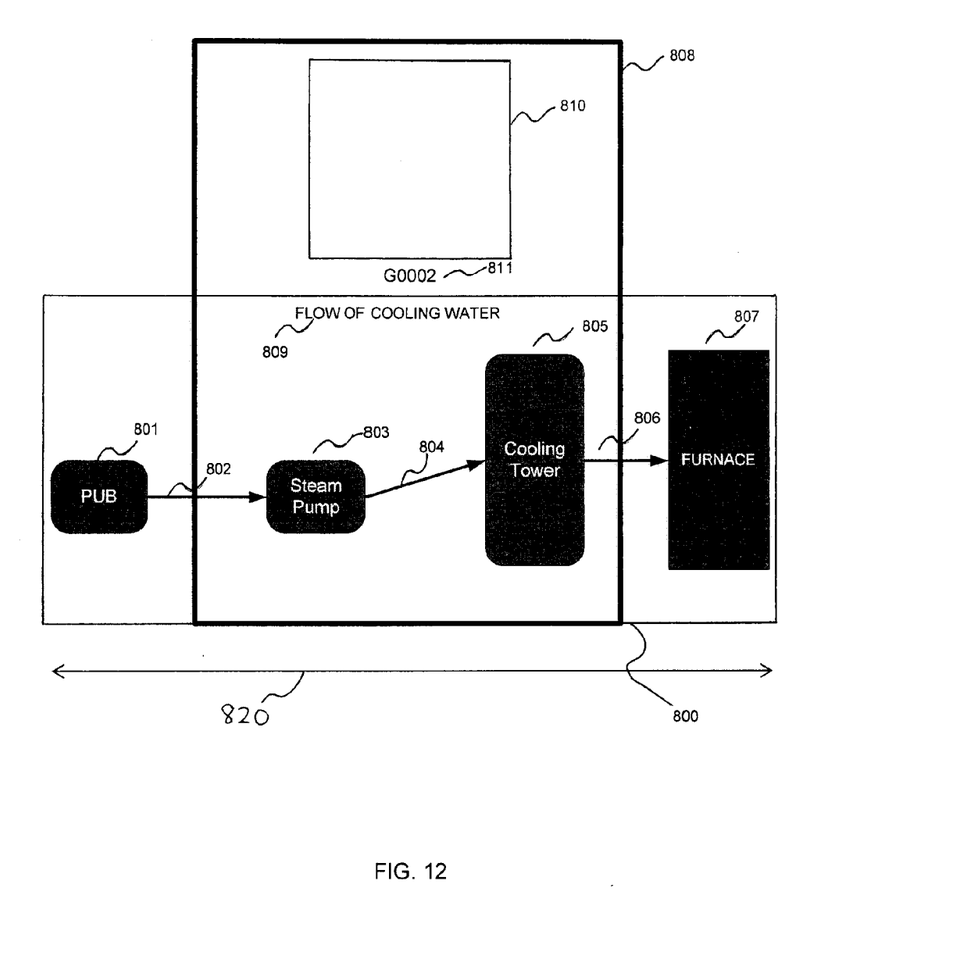
FIG. 12 is a schematic view of a material flow diagram with a portion displayed together with a graphics file relevant to the portion.
Figure 13:
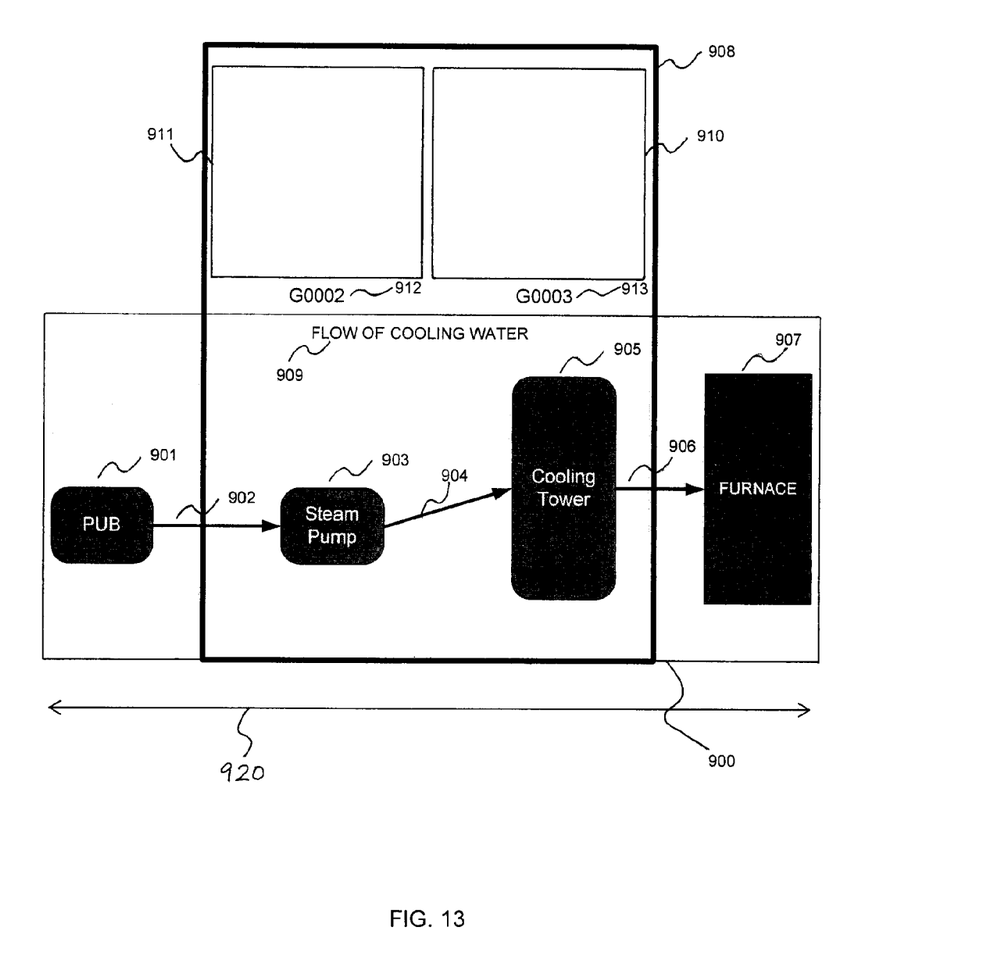
FIG. 13 is a schematic view of a material flow diagram with a portion displayed together with two graphics file relevant to the portion.
Figure 14:
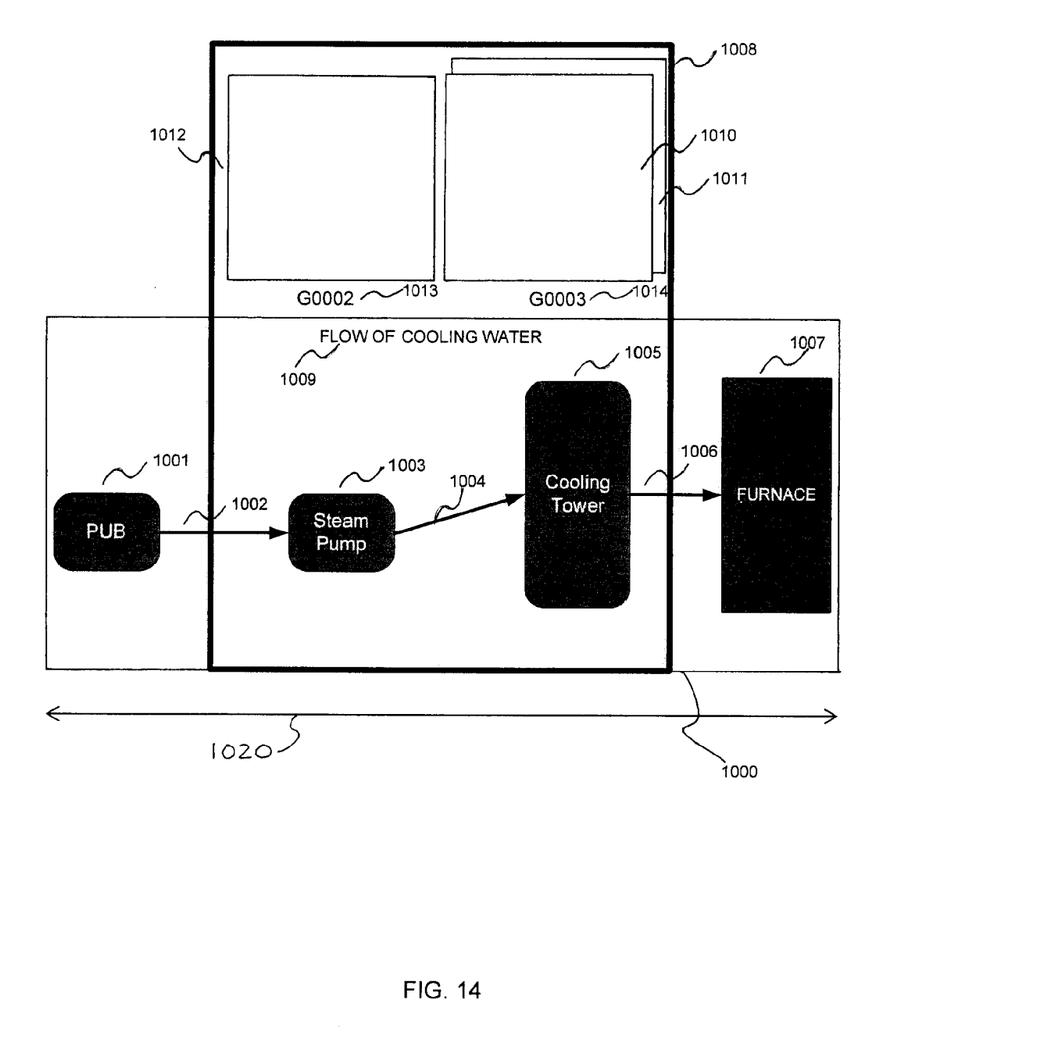
FIG. 14 is a schematic view of a material flow diagram with a portion displayed together with multiple graphics file relevant to the portion.

More preferably, the diagram display 68 is configured to also selectably display at least one graphic file relevant to the displayed portion of the material flow diagram, as shown in FIGS. 12 to 14. In FIG. 12, a graphics file 810 named G0002, 811 is displayed above a portion 808 of the material flow diagram. This means that the displayed portion 808 is actually drawn from a material data file that has been sorted out from a data set created from the graphic file 810. FIG. 13 shows a material flow diagram 900 comprising drawn elements 901 to 907 and a title 909. The displayed portion 908 has been drawn from material-specific data obtained from data sets created from two graphics files 910, 911, for example, where flow begins in graphics file 910 and ends in graphics file 911. As a user scrolls 820, 920 to display a different portion of the material flow diagram 800, 900, one or more different graphics files may appear depending on which graphics file contains the data set that the different portions of the material flow diagram 800, 900 are based upon.

Where a displayed portion 1008 is based upon multiple graphics files 1010 to 1012 as shown in FIG. 14, as may occur during branching, some of the graphics files 1010, 1011 may be displayed as a stack. Which graphics file 1010 or 1011 appears on top of the stack may depend on which element 1001 to 1007 is activated in the material flow diagram 1000. For example, cooling tower 1005 may be found in graphics file 1011 and activating cooling tower 1005 by clicking on it may result in graphics file 1011 moving to the top of the stack so that graphics file 1011 becomes visible to the user.

The diagram display 68 may further be configured to allow a user to alter placement of elements displayed in generated material flow diagrams although this should not include affecting actual material flow paths.

Using the present invention, a complete flow of any selected one of a plurality of materials in an industrial plant may therefore be viewed in isolation from other materials in the plant. This allows operators to monitor flow of various materials in a plant more effectively as there is no need to call up and switch between multiple graphics files in order to trace the flow of one any one material through the plant. A high correlation between the generated material flow diagrams and the physical layout of the plant is achieved, thereby allowing any problems shown in a material flow diagram to be readily traced to an actual physical location of the plant. This also makes training of new operators and performing line tracing easier and faster, improving plant efficiency and safety.

Whilst there has been described in the foregoing description exemplary embodiments of the present invention, it will be understood by those skilled in the technology concerned that many variations in details of design, construction and/or operation may be made without departing from the present invention. For example, when creating data sets, although one dialog box may be provided by the data set creation module for one element in a graphics file, alternatively, one dialog box may be provided for multiple elements in a graphics file. Or, one dialog box may be provided for entering data for elements in more than one graphics file. Also, although preferably one data set is created for one graphics file, one data set may be created for two or more graphics files. When extracting data from the data sets, instead of opening a graphics file to access a data set created for that graphics file, the data set may alternatively be stored independently of the graphics file so that sorting data does not require opening any graphics files but only requires opening one or more created data sets. Furthermore, instead of the data extraction module creating a material data file to capture entries specific to a particular material flowing in the industrial plant, the data extraction module may alternatively create a database table for the same purpose so that a plurality of database tables may be created for the respective plurality of distinct materials in the plant. Besides being activated only when all necessary graphics files have been created, the data extraction module may also be activated every time a new graphics file is created or when an existing graphics file is modified, so that the material data files or database tables can be continually updated with new or modified material-specific data. While information from generated material flow diagrams may be saved and stored, in an alternative embodiment, the information may be regenerated every time a material flow diagram is opened.

The invention claimed is:

1. A method of generating a material flow diagram for an industrial plant, the method comprising:
    creating at least one data set from at least one graphics file representing at least a portion of the industrial plant, each of the at least one data set contained in a respective material data file for each of a plurality of distinct materials flowing in the industrial plant;
    extracting and automatically sorting data from the at least one data set to obtain material-specific data for each of the plurality of distinct materials flowing in the industrial plant; and
    illustrating the material-specific data of a selected at least one of the plurality of distinct materials as a material flow diagram.

2. The method of claim 1, further comprising selectably displaying at least a portion of the material flow diagram.

3. The method of claim 2, further comprising selectably displaying at least one of the plurality of graphics files relevant to the displayed portion of the material flow diagram.

4. The method of claim 2, further comprising displaying readings obtained from the at least one data set on the material flow diagram.

5. The method of claim 1, wherein creating the at least one data set includes entering data into at least one dialog box provided for the at least one graphics file.

6. The method of claim 1, wherein creating the at least one data set includes automatically generating data during creation of the at least one graphics file.

7. The method of claim 1, wherein the at least one graphics file comprises a number of elements and creating the at least one data set includes associating each element with one of the plurality of distinct materials.

8. The method of claim 7, wherein creating the at least one data set further includes associating each element with at least one related element, the related element being selected from: a preceding element and a following element, wherein each element and its related element together form at least a portion of a flow path of one of the plurality of distinct materials.

9. The method of claim 7, wherein the material-specific data for a particular one of the plurality of distinct materials comprises data of all elements in the at least one graphics file associated with the particular one of the plurality of distinct materials.

10. The method of claim 1, wherein extracting the data includes creating a material data file for each of the plurality of distinct materials, each material data file containing the material-specific data for a respective each of the plurality of distinct materials.

11. An apparatus for generating a material flow diagram for an industrial plant, the apparatus comprising:
    a data set creation module configured for creating at least one data set from at least one graphics file representing the industrial plant, each of the at least one data set contained in a respective material data file for each of a plurality of distinct materials flowing in the industrial plant;
    a data extraction module configured for extracting and automatically sorting data from the at least one data set to obtain material-specific data for each of the plurality of distinct materials flowing in the industrial plant; and
    a flow illustrating module configured for illustrating the material-specific data of a selected one of the plurality of distinct materials as a material flow diagram.

12. The apparatus of claim 11, further comprising a diagram display configured for selectably displaying at least a portion of the material flow diagram.

13. The apparatus of claim 12, wherein the diagram display is further configured for selectably displaying the at least one graphics file relevant to the displayed portion of the material flow diagram.

14. The apparatus of claim 12, wherein the diagram display is further configured for displaying readings on the material flow diagram, the readings being obtained from the at least one data set.

15. The apparatus of claim 11, wherein the data set creation module is configured to provide at least one dialog box for the at least one graphics file, the dialog box being configured for entering data therein.

16. The apparatus of claim 11, wherein the data set creation module is configured for automatically capturing data generated during creation of the at least one graphics file.

17. The apparatus of claim 11, wherein the at least one graphics file comprises a number of elements and the data in the at least one data set includes association of each element with one of the plurality of distinct materials.

18. The apparatus of claim 17, wherein the data in the at least one data set further includes association of each element with at least one related element, the related element being selected from: a preceding element and a following element, wherein each particular element and its related element together form at least a portion of a flow path of one of the plurality of distinct materials.

19. The apparatus of claim 17, wherein the material-specific data for a particular one of the plurality of distinct materials comprises data of all elements in the at least one graphics file associated with the particular one of the plurality of distinct materials.

20. The apparatus of claim 11, wherein the data extraction module is configured to create a material data file for each of the plurality of distinct materials, each material data file containing the material-specific data for a respective each of the plurality of distinct materials.

* * * * *